United States Patent

Castellano et al.

[11] 4,108,793
[45] Aug. 22, 1978

[54] LIQUID CRYSTAL CELL

[75] Inventors: Joseph Anthony Castellano, North Brunswick; Michael Thomas McCaffrey, Cranbury, both of N.J.

[73] Assignee: RCA Corporation, New York, N.Y.

[21] Appl. No.: 410,566

[22] Filed: Oct. 29, 1973

Related U.S. Application Data

[63] Continuation of Ser. No. 40,996, May 25, 1970, abandoned.

[51] Int. Cl.$^2$ .............................................. G07F 1/16
[52] U.S. Cl. .................................... 252/299; 252/408
[58] Field of Search ......................... 252/408 LC, 299

[56] References Cited

U.S. PATENT DOCUMENTS 3,792,915  2/1974  Oh et al. ........................ 350/160 LC

FOREIGN PATENT DOCUMENTS 1,170,486  2/1971  United Kingdom.

OTHER PUBLICATIONS

Usoltseua et al., Chemical Characteristics, Struture & Properties of Liquid Crystals, 9/63, 495-505.

Liquid Crystals & Plastic Crystals, vol. 1, Ed., Gray & Winsor, pp. 170-174, C.W. 1974.

Primary Examiner—Samuel W. Engle
Assistant Examiner—Ralph Palo
Attorney, Agent, or Firm—H. Christoffersen; Birgit E. Morris

[57] ABSTRACT

Liquid crystal cells operable between wide temperature ranges (below 0° C up to 84° C) are provided. These cells include mixtures of compounds from the series

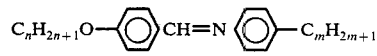

with a compound from the series

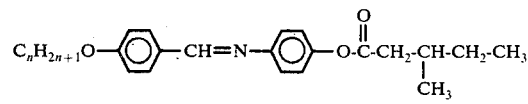

wherein $n$ is an integer from 1 to 7 and $m$ is an integer from 1 to 4.

8 Claims, 1 Drawing Figure

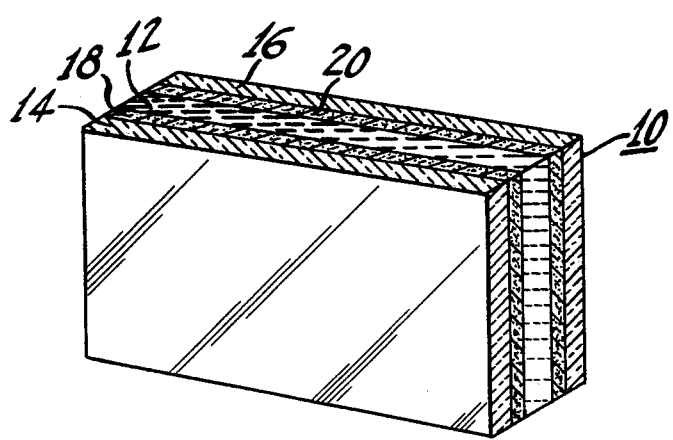

LIQUID CRYSTAL CELL

This is a continuation, of application Ser. No. 40,996, filed 5-25-70, now abandoned.

BACKGROUND OF THE INVENTION

This invention relates to electro-optical light scattering devices and particularly to such devices wherein the active medium includes a liquid crystal composition.

Thermotropic nematic liquid crystals are liquids with elongated polar molecules. One type of such crystals normally align themselves in an electric field so that their nearest neighbors are parallel to each other. This alignment causes a change in the light scattering properties of these materials. In another type of nematic liquid crystal, turbulence is caused when placed between two transparent electrodes and an electric current is sent through them disturbing the ordered state and causing the scattering of light directed onto the crystals. When this latter type of nematic liquid crystal is combined with a cholesteric material a storage effect is obtained.

The effective operation of liquid crystals in electro-optical light scattering devices is limited to a temperature range dependent upon the liquid crystal material used. This temperature range generally lies between the transition temperatures at which the liquid crystal material converts either to a solid or to an isotropic liquid.

A more detailed description of liquid crystal devices can be found with reference to an article by G. H. Heilmeier appearing in Scientific American, Volume 222, pages 100–106, April, 1970.

The ultimate commercial use of liquid crystals in many applications, such as windows, mirrors and in aircraft displays depends greatly upon the operable temperature range of the liquid crystal composition. For example, a window which can be converted from transparent to translucent may be subjected to winter temperatures of below freezing and to summer temperatures of over 100° F. Consequently, the transition temperatures of the liquid crystal composition, that is, the temperatures at which the composition either crystallizes or becomes an isotropic fluid, should be below the freezing point of water and above 100° F. Compositions of the present invention accomplishes this goal.

SUMMARY OF THE INVENTION

A liquid crystal cell comprises a liquid crystal composition disposed between a pair of electrodes. The particular liquid crystal composition includes a mixture of at least two compounds selected from the classes of compounds having the general formulae

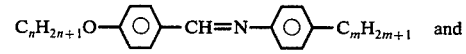

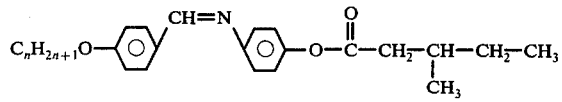

wherein $n$ is an integer of 1 to 7 and $m$ is an integer of 1 to 4.

BRIEF DESCRIPTION OF THE DRAWINGS

The FIGURE is a perspective elevational view of a simple liquid crystal cell.

DESCRIPTION OF THE PREFERRED EMBODIMENTS

Referring to the FIGURE, there is shown a liquid crystal cell 10 comprising a layer of a liquid crystal composition 12 sandwiched between a front transparent support plate 14 and a back support plate 16. The front support plate 14 is provided with a transparent electrode 18 on the inner surface thereof. The back support plate is similarly provided with an electrode 20 on its inner surface. If light is to be transmitted through the cell the back electrode 20 and back support plate 16 are transparent. If the cell is to reflect light the back electrode can then be made reflecting.

Applications and other configurations of liquid crystal cells are known in the art. For example, in U.S. Pat. No. 3,499,112, issued on Mar. 3, 1970 to G. H. Heilmeier and L. A. Zanoni, there is described a liquid crystal crossed-grid optical display device and a liquid crystal television.

We have discovered that liquid crystal cells comprising mixtures of liquid crystals selected from the chemical classes represented by the formula

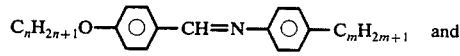

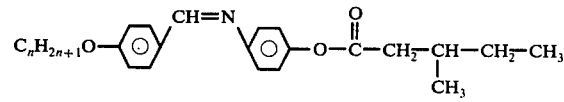

wherein $n$ is an integer from 1 to 7 and $m$ is an integer of from 1 to 4 operate over wide temperature ranges from below the freezing point of water to well above 100° F (approx. 37° C). Preferred compositions employ at least one compound of the first class with at least one compound of the second class.

Specific examples of useful mixtures appear in the table below. The compound designated in the table as "A" has the formula,

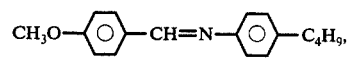

and has a nematic range of 22° to 48° C.

The compound designated in the table as "B" has the formula,

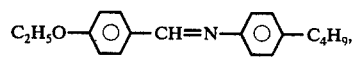

and has a nematic range of 36° to 78° C.

The compound designated in the table as "C" has the formula

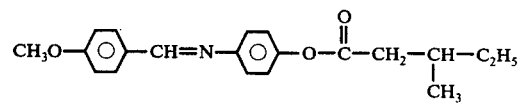

and has a mesomorphic range of 35° to 76° C.

| Mole % Composition | | | | |
|---|---|---|---|---|
| A | B | C | CN | NL |
| 33.3 | 33.3 | 33.3 | below −40° C | 65° C |
| 50 | 0 | 50 | below −40° C | 70° C |
| 0 | 50 | 50 | − 7° C | 84° C |
| 70.2 | 29.8 | 0 | below −40° C | 52° C |

The column heading CN relates to the temperature of transition from a solid crystal to the mesomorphic or liquid crystal state. The column heading NL relates to the temperature of transition from the liquid crystal state to an isotropic liquid. The temperature range of the liquid crystal state is therefore those temperatures from the CN temperature to the NL temperature.

A novel liquid crystal cell of the type described in the FIGURE and comprising the first composition shown in the table has operated between −25° and 65° C under DC excitation. The cell is also operable under AC excitation.

We have further discovered that if nematic liquid crystal mixtures include an optically active isomer such as an optically active isomer of the class of compounds designated as

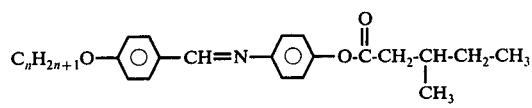

rather than a racemic mixture of such a compound, the novel device will exhibit the storage effect previously referred to. The reason for this is believed to be that the dextro or levo optical isomers are in the cholesteric mesophase while the racemic mixture is nematic in behavior.

A cell containing a ½ mil thick layer of a 1:1 weight ratio mixture of 1-isomer

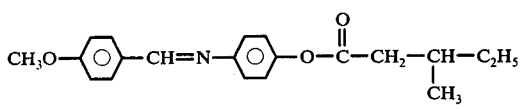

with 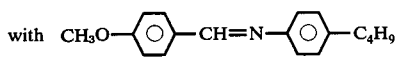

was transparent with no signal applied. When 50-100 volts DC or AC (100H$_z$) was applied the cell appeared white due to scattering of light. Removal of the field did not produce relaxation of the scattering mode. The scattering mode can be removed by application of a 50-100 volt AC signal at 1000-10,000 Hz.

The use of such optical isomers, for example, the 1-isomer of

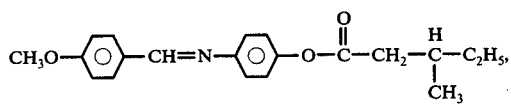

in place of prior art cholesterol derivitives, such as cholesteryl oleate, as the cholesteric material in the storage effect cells is advantageous in that the novel cells employing such isomers have faster response times than the prior art storage cells while still operating over a wide temperature range.

The optically active compound can be prepared by the synthetic route outlined below beginning with optically active methyl butyl bromide, such as 1-isomer-2-methylbutyl bromide.

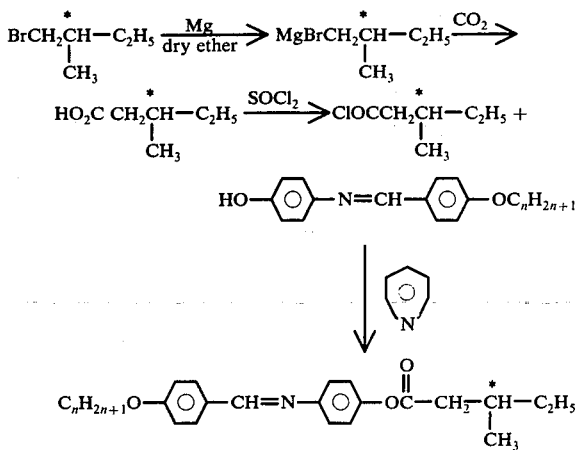

What is claimed is:

1. An electro-optical cell comprising a layer of a liquid crystal composition disposed between electrodes said liquid crystal composition comprising a mixture of a nematic liquid crystal compound with an optically active isomer of a compound the racemic mixture of which is nematic.

2. A liquid crystal cell comprising a layer of a liquid crystal composition disposed between electrodes, and means for applying an activating signal to said cell, said liquid crystal composition consisting essentially of a mixture of at least about 30 mol percent of one compound selected from CH$_3$O—⟨O⟩—CH=N—⟨O⟩—C$_4$H$_9$ and

C$_2$H$_5$O—⟨O⟩—CH=N—⟨O⟩—C$_4$H$_9$ with at least one compound from the class having the general formula

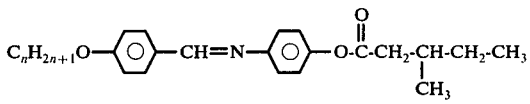

wherein $n$ is an integer from 1 to 7.

3. The electro-optical cell recited in claim 2 wherein said liquid crystal composition comprises a mixture of at least two compounds selected from the group consisting of

CH$_3$O—⟨O⟩—CH=N—⟨O⟩—C$_4$H$_9$,

C$_2$H$_5$O—⟨O⟩—CH=N—⟨O⟩—C$_4$H$_9$ and

CH$_3$O—⟨O⟩—CH=N—⟨O⟩—O—C(=O)—CH$_2$—CH(CH$_3$)—C$_2$H$_5$.

4. The electro-optical cell recited in claim 3 wherein said mixture includes from about 33 to 50 mole %

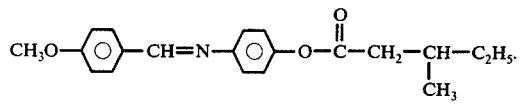

5. An electro-optical cell comprising a layer of a liquid crystal composition disposed between electrodes said composition comprising a mixture of at least one nematic liquid crystal with an optically active isomer of a compound chosen from the class represented by the formula

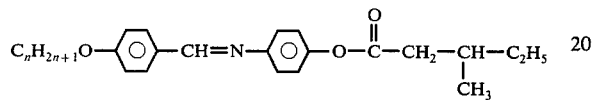

wherein $n$ is an integer from 1 to 7.

6. The electro-optical cell recited in claim 5 wherein said liquid crystal composition consists essentially of at least one nematic compound selected from

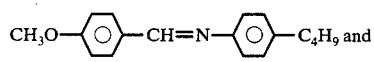

-continued

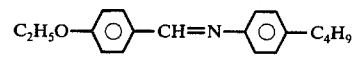

together with said optically active isomer.

7. The electro-optical cell recited in claim 5 wherein said liquid crystal composition is a mixture of at least one compound selected from

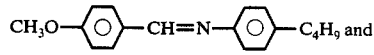

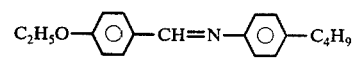

with an optically active isomer of

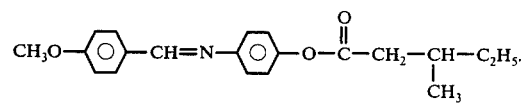

8. The electro-optical cell recited in claim 7 wherein said optically active isomer is the l-isomer of

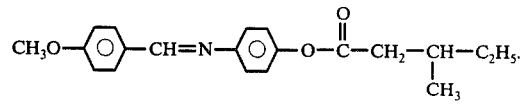

* * * * *